United States Patent [19]

Sanada

[11] Patent Number: 5,761,160
[45] Date of Patent: Jun. 2, 1998

[54] OPTICAL DISK PLAYBACK AND RECORDING DEVICE WHICH ALTERNATELY ALLOCATES LOGICAL ADDRESSES ON DIFFERENT SIDES OF DISK

[75] Inventor: Satoru Sanada, Yokohama, Japan

[73] Assignee: Nikon Corporation, Tokyo, Japan

[21] Appl. No.: 606,818

[22] Filed: Feb. 26, 1996

[30] Foreign Application Priority Data

Mar. 15, 1995 [JP] Japan .................... 7-055977

[51] Int. Cl.$^6$ .................... G11B 17/22
[52] U.S. Cl. .................... 369/32; 369/48
[58] Field of Search .................... 369/32, 13, 275.1, 369/50, 284, 47, 54, 44.37, 14, 44.32, 44.31, 124, 48, 44.38; 360/48, 51, 86, 77.05

[56] References Cited

U.S. PATENT DOCUMENTS

| | | | |
|---|---|---|---|
| 4,788,671 | 11/1988 | Kanda | 369/13 |
| 4,873,679 | 10/1989 | Murai et al. | 369/32 |
| 5,253,242 | 10/1993 | Satoh et al. | 369/47 |

FOREIGN PATENT DOCUMENTS

| | | |
|---|---|---|
| 0 273 384 | 7/1988 | European Pat. Off. . |
| 0 487 296 A2 | 5/1992 | European Pat. Off. . |
| 0 630 006 A1 | 12/1994 | European Pat. Off. . |
| 0 639 830 A1 | 2/1995 | European Pat. Off. . |

*Primary Examiner*—Ali Neyzari

[57] ABSTRACT

An optical disk playback and recording device has a control unit which alternately allocates sequential logical addresses between single or multiple continuous sectors on each side of a two-sided optical disk with disk regions divided into tracks having sectors. The device also has first and second playback and recording heads, one disposed on each side of the disk, playing back data from or recording data to sectors identified by the logical addresses of data for playback or recording. Such a device achieves increased data transmission speeds by allowing access to data occupying alternately located sectors on each side of the optical disk by both the first and second heads. The control unit also controls access to such an optical disk. Where the optical disk playback and recording device has a higher playback and recording frequency for tracks located toward the periphery of the disk, the device can achieve both uniform and increased data transmission speeds. The device has a control unit alternately allocating sequential logical addresses to a varying number of continuous sectors between sectors in tracks located toward the center of one side of the disk and sectors in tracks located toward the periphery of the other side of the disk. The control unit also controls access to such an optical disk.

29 Claims, 5 Drawing Sheets

FIG. 2A

SURFACE A TRACK NUMBER → TRACK FOLLOWING DIRECTION

| Track | 0 | 1 | 2 | 3 | 4 | 5 | 6 | 7 | 8 | 9 | | 48 | 49 |
|---|---|---|---|---|---|---|---|---|---|---|---|---|---|
| 100 | 0/0 | 1/1 | 2/4 | 3/5 | 4/8 | 5/9 | 6/12 | 7/13 | 8/16 | 9/17 | | 48/96 | 49/97 |
| 101 | 0/100 | 1/101 | 2/104 | 3/105 | 4/108 | 5/109 | 6/112 | 7/113 | 8/116 | 9/117 | | 48/196 | 49/197 |
| 100+N | 0/100*N | 1/100*N+1 | 2/100*N+4 | 3/100*N+5 | 4/100*N+8 | 5/100*N+9 | 6/100*N+12 | 7/100*N+13 | 8/100*N+16 | 9/100*N+17 | | 48/100*N+96 | 49/100*N+97 |

FIG. 2B

SURFACE B TRACK NUMBER → TRACK FOLLOWING DIRECTION

| Track | 0 | 1 | 2 | 3 | 4 | 5 | 6 | 7 | 8 | 9 | | 48 | 49 |
|---|---|---|---|---|---|---|---|---|---|---|---|---|---|
| 100 | 0/2 | 1/3 | 2/6 | 3/7 | 4/10 | 5/11 | 6/14 | 7/15 | 8/18 | 9/19 | | 48/98 | 49/99 |
| 101 | 0/102 | 1/103 | 2/106 | 3/107 | 4/110 | 5/111 | 6/114 | 7/115 | 8/118 | 9/119 | | 48/198 | 49/199 |
| 100+N | 0/100*N+2 | 1/100*N+3 | 2/100*N+6 | 3/100*N+7 | 4/100*N+10 | 5/100*N+11 | 6/100*N+14 | 7/100*N+15 | 8/100*N+18 | 9/100*N+19 | | 48/100*N+98 | 49/100*N+99 |

BUFFER MEMORY 4A

BUFFER MEMORY 4B

FIG. 5A

SURFACE A TRACK NUMBER — TRACK FOLLOWING DIRECTION →

| Track | | | | | | | | | | | | | |
|---|---|---|---|---|---|---|---|---|---|---|---|---|---|
| 100 | $\frac{0}{0}$ | | $\frac{1}{1}$ | | $\frac{2}{6}$ | | $\frac{3}{7}$ | | $\frac{4}{12}$ | | | $\frac{99}{115}$ | |
| 101 | $\frac{0}{120}$ | | $\frac{1}{121}$ | | $\frac{2}{126}$ | | $\frac{3}{127}$ | | $\frac{4}{132}$ | | | $\frac{99}{235}$ | |
| 100+N−1 | $\frac{0}{120*(N-1)}$ | $\frac{1}{120*(N-1)+1}$ | $\frac{2}{120*(N-1)+2}$ | $\frac{3}{120*(N-1)+3}$ | $\frac{4}{120*(N-1)+6}$ | $\frac{5}{120*(N-1)+7}$ | $\frac{6}{120*(N-1)+8}$ | $\frac{7}{120*(N-1)+9}$ | $\frac{8}{120*(N-1)+12}$ | $\frac{9}{120*(N-1)+13}$ | | $\frac{78}{120*(N-1)+116}$ | $\frac{79}{120*(N-1)+117}$ |
| 100+N | $\frac{0}{120*N}$ | $\frac{1}{120*N+1}$ | $\frac{2}{120*N+2}$ | $\frac{3}{120*N+3}$ | $\frac{4}{120*N+6}$ | $\frac{5}{120*N+7}$ | $\frac{6}{120*N+8}$ | $\frac{7}{120*N+9}$ | $\frac{8}{120*N+12}$ | $\frac{9}{120*N+13}$ | | $\frac{78}{120*N+116}$ | $\frac{79}{120*N+117}$ |

FIG. 5B

SURFACE B TRACK NUMBER — TRACK FOLLOWING DIRECTION →

| Track | | | | | | | | | | | | | |
|---|---|---|---|---|---|---|---|---|---|---|---|---|---|
| 100 | $\frac{0}{120*N+4}$ | | $\frac{1}{120*N+5}$ | | $\frac{2}{120*N+10}$ | | $\frac{3}{120*N+11}$ | | $\frac{4}{120*N+16}$ | | | $\frac{99}{120*N+119}$ | |
| 101 | $\frac{0}{120*(N-1)+4}$ | | $\frac{1}{120*(N-1)+5}$ | | $\frac{2}{120*(N-1)+10}$ | | $\frac{3}{120*(N-1)+11}$ | | $\frac{4}{120*(N-1)+16}$ | | | $\frac{99}{120*(N-1)+119}$ | |
| 100+N−1 | $\frac{0}{122}$ | $\frac{1}{123}$ | $\frac{2}{124}$ | $\frac{3}{125}$ | $\frac{4}{128}$ | $\frac{5}{129}$ | $\frac{6}{130}$ | $\frac{7}{131}$ | $\frac{8}{134}$ | $\frac{9}{135}$ | | $\frac{78}{238}$ | $\frac{79}{239}$ |
| 100+N | $\frac{0}{2}$ | $\frac{1}{3}$ | $\frac{2}{4}$ | $\frac{3}{5}$ | $\frac{4}{8}$ | $\frac{5}{9}$ | $\frac{6}{10}$ | $\frac{7}{11}$ | $\frac{8}{14}$ | $\frac{9}{15}$ | | $\frac{78}{118}$ | $\frac{79}{119}$ |

FIG. 6A PRIOR ART

SURFACE A
TRACK
NUMBER → TRACK FOLLOWING DIRECTION

| 100 | 0/0 | 1/1 | 2/2 | 3/3 | 4/4 | 5/5 | 6/6 | 7/7 | 8/8 | 9/9 | ... | 48/48 | 49/49 |
|---|---|---|---|---|---|---|---|---|---|---|---|---|---|
| 101 | 0/50 | 1/51 | 2/52 | 3/53 | 4/54 | 5/55 | 6/56 | 7/57 | 8/58 | 9/59 | ... | 48/98 | 49/99 |
| 100+N | 0/50*N | 1/50*N+1 | 2/50*N+2 | 3/50*N+3 | 4/50*N+4 | 5/50*N+5 | 6/50*N+6 | 7/50*N+7 | 8/50*N+8 | 9/50*N+9 | ... | 48/50*N+48 | 49/50*N+49 |

FIG. 6B PRIOR ART

SURFACE B
TRACK
NUMBER → TRACK FOLLOWING DIRECTION

| 100 / 101 | 0/50*(N+1) | 1/50*(N+1)+1 | 2/50*(N+1)+2 | 3/50*(N+1)+3 | 4/50*(N+1)+4 | 5/50*(N+1)+5 | 6/50*(N+1)+6 | 7/50*(N+1)+7 | 8/50*(N+1)+8 | 9/50*(N+1)+9 | ... | 48/50*(N+1)+48 | 49/50*(N+1)+49 |
|---|---|---|---|---|---|---|---|---|---|---|---|---|---|
|  | 0/50*(N+2) | 1/50*(N+2)+1 | 2/50*(N+2)+2 | 3/50*(N+2)+3 | 4/50*(N+2)+4 | 5/50*(N+2)+5 | 6/50*(N+2)+6 | 7/50*(N+2)+7 | 8/50*(N+2)+8 | 9/50*(N+2)+9 | ... | 48/50*(N+2)+48 | 49/50*(N+2)+49 |
| 100+N | 0/100*N | 1/100*N+1 | 2/100*N+2 | 3/100*N+3 | 4/100*N+4 | 5/100*N+5 | 6/100*N+6 | 7/100*N+7 | 8/100*N+8 | 9/100*N+9 | ... | 48/100*N+98 | 49/100*N+99 |

OPTICAL DISK PLAYBACK AND RECORDING DEVICE WHICH ALTERNATELY ALLOCATES LOGICAL ADDRESSES ON DIFFERENT SIDES OF DISK

BACKGROUND OF THE INVENTION

1. Field of the Invention

The present invention is related to an optical disk playback and recording device which is used with computers and image processing devices. In particular, the present invention is related to an optical disk playback and recording device having multiple playback and recording heads operating on an optical disk having logical addresses alternately arranged on both surfaces of the disk in block units of a given organization.

2. Description of the Related Art

Generally, optical disks have tracks which can record and playback data on both sides of the disk. Conventional optical disk recording and playback devices use one optical head to record or playback data on the tracks of the side where that optical head exists. To record and playback data on the surface where the optical head does not exist, a human being or an automatic changing device performs the operation of switching the disk surface, which may require taking out and then reinserting the disk into the optical disk recording and playback device.

In consideration of the limitations described above, attention has centered on making larger volume computer external memory devices in recent years. In particular, several methods of making the memory capacity larger in optical disk recording and playback devices have been proposed. Representative of these are methods to increase the memory volume by making the recording density of the optical disk itself larger, but this requires a considerable amount of development time in order to carry out development of the essential technologies.

Other proposed methods attempt to increase the optical disk's memory capacity by improving the playback and recording access, leaving the optical disk itself intact. One method allows access to both surfaces of the optical disk without switching the disk or requiring the user to take out, invert, and reinsert the optical disk. This may be accomplished by providing a structure wherein the optical head can move to both sides of the disk. Another approach keeps separate optical heads on both sides of the optical disk. By these methods, it is possible to have twice the "on-line volume" compared to a conventional optical disk recording and playback device, without physically increasing the recording density of the optical disk itself.

However, in the conventional technology described above, even if it is possible to increase the on-line volume, the data transmission speed during recording and playback is not improved, and the time required to record and playback is not rapid. The following describes the conventional addressing scheme for optical disks and the resulting problems in accessing speed and throughput inherent in the conventional addressing scheme.

Generally, each track formed on the recording surface of an optical disk is partitioned into multiple regions called sectors. Recording onto or playing back from the optical disk is normally conducted by command input from a host computer. The designation of the access position (position of the sector where recording and playback takes place) involves the designation of a logical address (or a logical sector).

Unlike the logical address, the physical address is composed of the track number and sector number which are pre-recorded on the optical disk for each sector. These physical addresses are, for example, recorded within an identification recording region within each sector. The optical disk recording and playback device records and plays back from the desired sectors by converting the logical address, designated from the host computer, to the physical address (the actual physical track number and sector number).

FIGS. 6A and 6B are diagrams depicting an example of the allocation of logical addresses in relation to the physical addresses of the sectors within the tracks on an optical disk (surface A depicted by FIG. 6A and surface B depicted by FIG. 6B). There are 50 sectors in each track, and the numbers depicted in the upper portions represent the physical addresses of the sector, while the numbers depicted in the lower portions are the allocated logical addresses. In addition, the "*"(asterisk) in the diagram indicates the multiplication sign.

According to the example depicted in FIGS. 6A and 6B, the logical addresses are sequentially allocated to each surface. In other words, the logical addresses are attached sequentially to the sectors of surface A from number 0 to number (50*N+49), and the addresses from number (50*N+49), which is the last logical address of surface A, up to the next number (50*(N+1)) are attached to the sectors of surface B.

Given the conventional sequential logical addressing order described above, an optical disk system can only achieve the data transmission speed of a conventional optical disk recording and playback device which accesses one surface at a time, even if the optical disk system has a single head operating on both surfaces or two independent heads, one on either side of the optical disk. With a single head system, only one sector may be accessed at a time, whether or not the head can be operated on both surfaces. In addition, with logical addresses sequentially ordered on each surface, access of data occupying several continuous sectors on a surface may only be achieved by accessing one sector at a time, even if two independent heads are operating on either surface of the disk. Thus, even though there may be multiple playback and recording heads, the data transmission speed is the same as a conventional optical disk recording and playback device which accesses one surface at a time.

SUMMARY OF THE INVENTION

Accordingly, it is an object of the present invention to provide an optical disk playback and recording device having an increased on-line capacity.

It is a further object of the present invention to provide an optical disk playback and recording device having an increased data transmission speed and throughput.

It is another object of the present invention to provide an optical disk playback and recording device having logical addresses alternately arranged on both surfaces of the disk such that accessing of multiple continuous logical sectors may be accomplished by multiple playback and recording heads at the same time.

It is yet another object of the present invention to provide an optical disk playback and recording device having an increased and uniform data transmission speed in a disk system wherein the recording and playback frequency increases for tracks located toward the periphery of the disk.

Objects of the present invention are achieved by providing an optical disk playback device having a control unit alternately allocating sequential logical addresses between single or multiple continuous sectors on each side of a two-sided optical disk with disk regions divided into tracks having sectors, and first and second playback and recording heads, one disposed on each side of the disk, playing back data from, or recording data to, sectors identified by the logical addresses of data for playback or recording.

Objects of the present invention are also achieved by providing an optical disk playback and recording device with a two-sided optical disk with disk regions divided into tracks having sectors. The device having a control unit alternately allocating sequential logical addresses to varying continuous sectors between sectors in tracks located toward the center of one side of the disk and sectors in tracks located toward the periphery of the other side of the disk, and first and second playback and recording heads, one disposed on each side of the disk, playing back data from, or recording data to, sectors identified by the logical addresses of data for playback or recording, wherein a higher playback and recording frequency is used for tracks located toward the periphery of the disk.

Objects of the present invention are further achieved by providing an optical disk having disk regions divided into tracks having sectors, and sequential logical addresses alternately allocated between single or multiple continuous sectors on each side of the disk.

Moreover, objects of the present invention are achieved by providing an optical playback and recording device having a control unit controlling access to a two-sided optical disk having disk regions divided into tracks having sectors and sequential logical addresses alternately allocated between single or multiple continuous sectors on each side of the disk; and, first and second playback and recording heads, one disposed on each side of the disk, playing back data from or recording data to sectors identified by the logical addresses of data for playback or recording.

In addition, objects of the present invention are also achieved by providing a method for increasing data transmission speeds in an optical disk playback and recording device. The method has the steps of alternately allocating sequential logical addresses between single or multiple continuous sectors on each side of a two-sided optical disk having disk regions divided into tracks and subdivided into sectors; accessing sectors of the disk identified by the logical addresses of data for playback or recording; and, playing back data from or recording data to the disk.

Yet another method for achieving the objects of the present invention is given by a method for providing increased and uniform data transmission speeds in an optical disk playback and recording device having a higher playback and recording frequency toward the periphery of an optical disk. The method has the steps of alternately allocating sequential logical addresses to single or multiple continuous sectors on each side of the disk having disk regions divided into tracks and subdivided into sectors; accessing sectors of the disk identified by the logical addresses of data for playback or recording; and, playing back data from or recording data to the disk.

BRIEF DESCRIPTION OF THE DRAWINGS

These and other objects and advantages of the invention will become apparent and more readily appreciated from the following description of the preferred embodiments, taken in conjunction with the accompanying drawings.

FIGS. 2A and 2B are diagrams depicting an arrangement of logical sectors on an optical disk (surface A depicted by FIG. 2A and surface B depicted by FIG. 2B) used in the first embodiment of the present invention.

FIGS. 5A and 5B are diagrams depicting an arrangement of logical sectors on an optical disk (surface A depicted by FIG. 5A and surface B depicted by FIG. 5B) in a second preferred embodiment of the present invention.

FIGS. 6A and 6B are diagrams depicting the logical sector arrangement of a conventional optical disk (surface A depicted by FIG. 6A and surface B depicted by FIG. 6B).

DETAILED DESCRIPTION OF THE PREFERRED EMBODIMENTS

Figure 1:
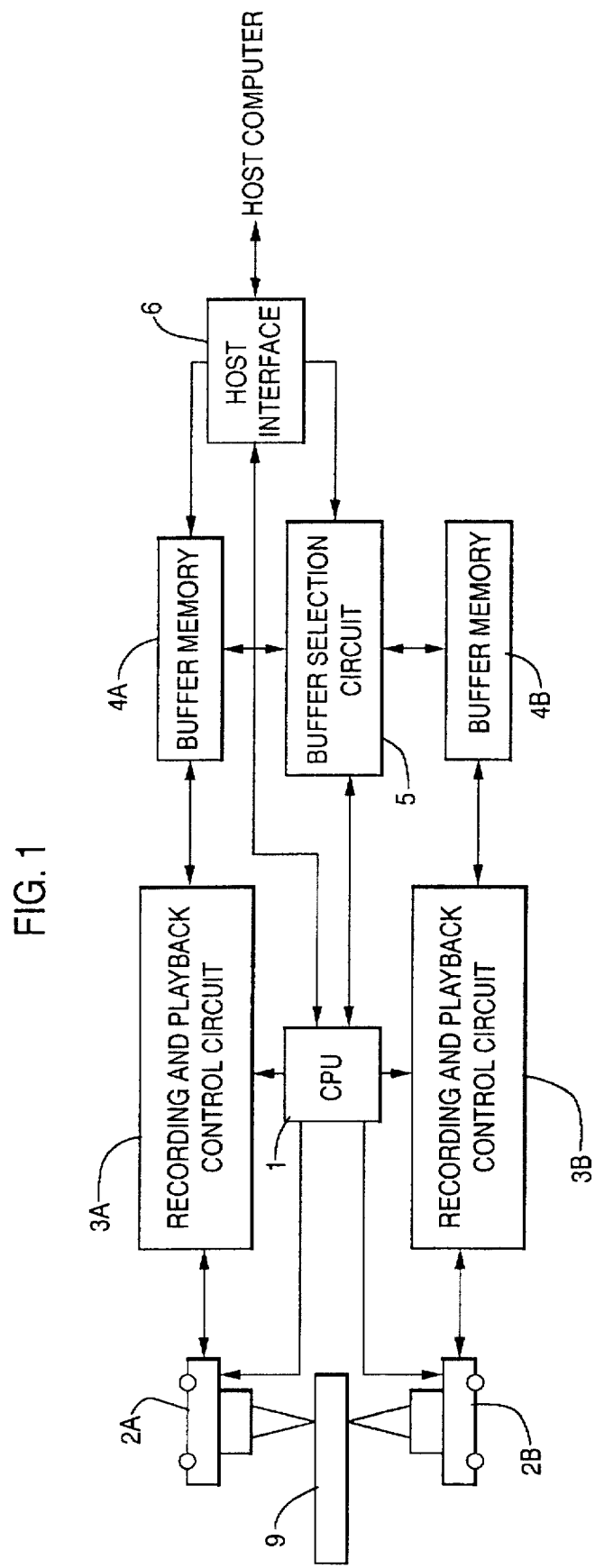
FIG. 1 is a block diagram of an optical disk recording and playback device according to a first preferred embodiment of the present invention.

Reference will now be made in detail to the present preferred embodiments of the present invention, examples of which are illustrated in the accompanying drawings, wherein like reference numerals refer to like elements throughout.

FIG. 1 is a diagram depicting an optical disk recording and playback device according to a first preferred embodiment according to the present invention. In FIG. 1, CPU1 includes a microcomputer and controls the device as, a whole. Optical heads 2A and 2B comprise lasers and optical parts, move in the radial direction of optical disk 9, and conduct recording and playback by irradiating the tracks of the optical disk with a light beam.

Recording and playback control circuits 3A and 3B control the exit strength of the light beam by reading the data, to be recorded, that is stored in buffer memories 4A and 4B. The playback control circuits 3A and 3B also control the lasers of optical heads 2A and 2B according to that data. Furthermore, optical heads 2A and 2B have built-in optoelectric convertors to receive the reflected light of the light beam that is irradiated on disk 9. The output signals (playback signals) from these optoelectric convertors are inputted to recording and playback control circuits 3A and 3B. Then, playback data is created by recording and playback control circuits 3A and 3B. In other words, recording and playback control circuits 3A and 3B execute control in order to record data on disk 9, and conduct processing in order to create playback data.

Buffer memories 4A and 4B are devices temporarily storing data (data to be recorded or playback data) for transmission and reception with the host computer. Buffer selection circuit 5 provides switching between the buffer memories 4A and 4B used in transmitting data to the host computer. Host interface control circuit 6 controls data transmission to the host computer.

For the recording and playback of data on surface A of optical disk 9, optical head 2A, recording and playback control circuit 3A, and buffer memory 4A are used. On the other hand, for recording and playback of data on surface B of optical disk 9, optical head 2B, recording and playback control circuit 3B, and buffer memory 4B are used.

FIGS. 2A and 2B depict the logical sector arrangement of optical disk 9 (surface A depicted by FIG. 2A and surface B depicted by FIG. 2B). There are 50 sectors on each track (100+N from track number 100). The numbers depicted in the top portions represent the physical address of each sector, and the numbers depicted in the bottom portions represent the logical address of each sector. The physical address is the actual address information written into an identification region in each sector of optical disk 9. A physical address is attached to each sector in an order from 0 to 49. CPU1 controls the alternate allocation of sequential logical addresses to a block of two continuous sectors each to surface A and surface B from the sector of physical address 0 of track number 100 of surface A. For example, logical addresses 0 and 1 are allocated to the sectors of physical addresses 0 and 1 of track 100 of surface A, and logical addresses 2 and 3 are allocated to the sectors of physical addresses 0 and 1 of track 100 of surface B. Continuing this allocation scheme, logical addresses 4 and 5 are allocated to the sectors of physical addresses 2 and 3 of track 100 of surface A. CPU1 also controls the access to an optical disk with this alternately arranged logical addressing scheme.

The optical disk which is used in this first embodiment has a recording format based on a CAV (constant angular velocity) system. In a CAV system, the optical disk is rotated at a fixed number of revolutions, and the recording and playback frequency is the same for all tracks of the optical disk. In a CAV system, the closer the track is to the periphery of the disk, the faster the linear velocity becomes. Because the recording frequency must be the same on every track, the length of the mark recorded is longer the closer the track is to the periphery of the disk. Consequently, the recording density is smaller at the periphery of the disk. However, as shown in FIGS. 2A and 2B, the number of sectors included in one track is the same for both the inside track and the peripheral track.

The operation of the optical disk system according to the present invention will now be described. First, the reading of data that is recorded on optical disk 9 and the transmission of this data to the host computer will be explained. For explanation purposes, it is assumed that the region to be read is the 50 sectors from logical address 0 up to 49.

The read command transmitted from the host computer is input to CPU1 through host interface control circuit 6. CPU1 analyses the read command and derives what sectors to read from the tracks and sectors on each surface of optical disk 9 based on the alternately allocated logical addressing scheme described above. In the present embodiment, the optical disk 9 has logical addresses alternately divided into blocks of two continuous sectors each between surface A and surface B, as depicted in FIGS. 2A and 2B and described above. Thus, a total of 26 sectors from the sector of physical address 0 of track number 100 up to the sector of physical address 25 is read from surface A. A total of 24 sectors from the sector of physical address 0 of track number 100 up to the sector of physical address 23 is read from surface B.

CPU1 controls moving of the optical heads 2A and 2B to the desired track positions corresponding to their respective surfaces. Afterwards, commands are given to recording and playback control circuits 3A and 3B respectively to read the data of the sectors at the aforementioned physical addresses. The data read by recording and playback circuits 3A and 3B are stored in buffer memories 4A and 4B respectively.

When all the data from the aforementioned 50 sectors are stored in buffer memories 4A and 4B, CPU1 executes control to transmit the read data to the host computer through host interface control circuit 6.

Figure 3A:
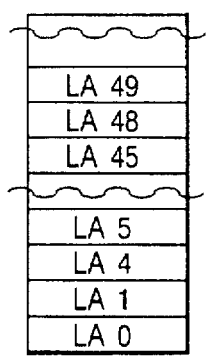
FIGS. 3A and 3B are diagrams depicting data that is stored in the buffer memory (buffer memory 4A depicted by FIG. 3A and buffer memory 4B depicted by FIG. 3B) of an optical disk recording and playback device according to the first embodiment of the present invention.
Figure 3B:
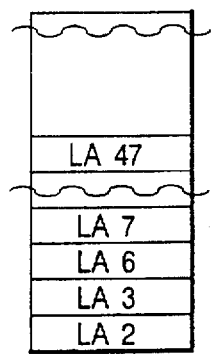

FIGS. 3A and 3B depict an example of data that is stored respectively in buffer memories 4A and 4B (buffer memory 4A depicted by FIG. 3A and buffer memory 4B depicted by FIG. 3B). For instance, in the region labelled LA.1, the data from the sector of logical address 5 is stored. Buffer selection circuit A reads the data stored respectively in buffer memories 4A and 4B, arranges them in logical address order, and outputs this to host interface control circuit 6. The data is then transmitted to the host computer.

Figure 4:
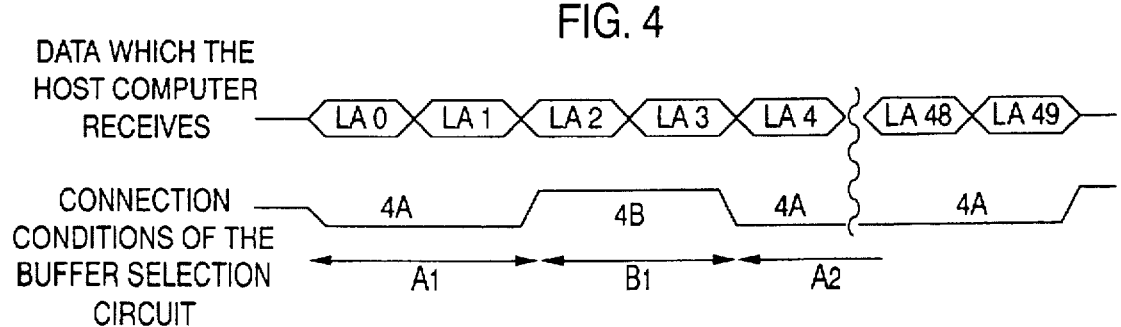
FIG. 4 is a diagram depicting data transmission timing in an optical disk recording and playback device in the first embodiment of the present invention.

FIG. 4 depicts an example of data transmission timing for an optical disk recording and playback device according to the present invention. CPU1 executes the control for sending commands to buffer selection circuit 5. CPU1 first issues a command to buffer selection circuit 5 such that 4A is selected as the buffer memory which transmits data to the host computer. The data up to logical addresses 0–1 stored in buffer memory 4A are transmitted to the host computer (the time period indicated by code A1 in FIG. 4). Once transmission is completed, CPU1 issues a command to buffer selection circuit 5 such that 4B is now selected as the buffer memory to transmit data to the host computer. The data up to logical addresses 2–3 stored in buffer memory 4B are transmitted to the host computer (the time period indicated by the code B1 in FIG. 4). Reading of the data from optical disk 9 is completed by repeating these steps sequentially until all the data has been sent.

The writing (recording) operation is now explained. When writing data, the write command is sent from the host computer to host interface control circuit 6, and the data to be written is also transmitted from the host computer. CPU1 analyses the write command from the host computer. CPU1 attaches logical addresses to the data to be written. CPU1 converts the logical addresses to physical addresses based on the alternately allocated logical addressing scheme described above. Then, CPU1 controls buffer selection circuit 5 such that when the sectors of the corresponding physical addresses are sectors that exist on surface A of the optical disk, the data to be written is sent to buffer memory 4A. When the sectors of the equivalent physical addresses are sectors existing on surface B of disk 9, the data to be written is sent to buffer memory 4B. CPU1 then executes control for moving optical heads 2A and 2B to the desired track positions corresponding to their respective surfaces. Commands are issued to recording and playback control circuits 3A and 13B respectively to record the data stored in buffer memories 4A and 4B in the sectors of the corresponding physical addresses.

If a switching configuration is built into the hardware such that CPU1 does not intervene in the switching operation of buffer selection circuit 5, overhead can be reduced and faster data transmission can be realized.

According to the above embodiment of the present invention, an optical disk playback and recording device can achieve superior data transmission speeds over conventional systems. In a conventional optical disk recording and playback device, because the logical addresses are allocated sequentially, the time required for storing, for example, 50 sectors of data into the buffer memory is approximately 50 sector times. One sector time is the time required for the optical head to arrive at a desired sector to read or write a sector of data. In contrast, the time required to accomplish the same task in the present embodiment may be as short as 26 sector times. Thus, the processing time, for an optical playback and recording device according to the above embodiment of the present invention, to send the same amount of data may be approximately one-half the time required for a conventional system. Consequently, the data transmission speed of the above embodiment according to the present invention may be double that of the conventional system.

However, the present invention is not limited to the optical disk playback and recording device of the above embodiment. For example, the block units of the logical addresses allocated alternately to the A surface and the B surface are not limited to two continuous sectors each, but rather, may be one sector or more than two continuous sectors each. However, if the block unit is too large, the transmission speed may not be greatly improved because the probability of accessing both sides simultaneously for data requiring a small number of sectors will decrease.

In addition, the present invention is not limited to an optical disk playback and recording device having only one optical disk with alternately allocated logical addresses. A plurality of optical disks having alternately allocated logical addresses may also be employed by an optical disk playback and recording device according to the present invention.

Moreover, the present invention is not limited to the CAV system as described above. The present invention may also be employed in other CAV systems, as described below.

MCAV (modified CAV) systems are systems which can increase the recording capacity over CAV systems. In a MCAV system, the optical disk is rotated at a fixed number of rotations, and the recording and playback frequency becomes higher toward the periphery of the disk. Thus, the recording density is nearly constant, regardless of whether the track is toward the periphery of the disk. In particular, the length of the marks that are recorded are nearly constant on every track.

A practical form of an MCAV system is the Zone CAV system. The Zone CAV system divides the disk tracks into multiple groups for multiple tracks. These groups are called zones. These multiple zones are disposed in a donut shape. The tracks belonging to the same zone execute recording and playback at the same block frequency. However, the closer the zone is to the periphery (zones with a fast linear speed) the higher the recording and playback frequency. In this manner, the recording density of the zones is made uniform.

Recording and playback of disks which have a Zone CAV format are executed by making the 1 track time (the time in which the disk rotates once) constant. However, because the recording and playback frequency varies depending on the various zones, the number of sectors per track varies depending on the zone. Thus, zones which have a higher recording and playback frequency (i.e., the peripheral zones) have a higher number of sectors per track. In this manner, MCAV systems and Zone CAV systems can achieve increased memory capacity with a uniform recording density on the disk.

Nevertheless, even in MCAV and Zone CAV optical disk systems, by alternately arranging the logical addresses on the A/B surfaces in multiple sector units according to the present invention, a more effective logical addressing arrangement and improved data transmission speeds can be achieved. For instance, recording and playback on a disk using a Zone CAV system is characterized by the data transmission speed being slow in the zones with a low recording and playback frequency (i.e., the inside zone—toward the center of the disk.), and fast in the zones with a high recording and playback frequency (i.e., the periphery zone—toward the periphery of the disk). The transmission speed changes depending on the zone in recording and playback of an optical disk in a Zone CAV system. However, a uniform data transmission speed may be preferred, regardless of the disk region being recorded or played back. A second embodiment of an optical disk playback and recording device according to the present invention is described below to achieve a more uniform data transmission speed in a Zone CAV system.

FIGS. 5A and 5B are diagrams depicting a logical sector arrangement of an optical disk (surface A depicted by FIG. 5A and surface B depicted by FIG. 5B) according to a second embodiment of the present invention. This optical disk is partitioned into two zones each on surface A and surface B. The number of sectors per track changes depending on the zone. Tracks 100 and 101 are included in the same zone, while tracks (100+N−1) and (100+N) are included in another zone. The zone to which tracks (100+N−1) and (100+N) belong is located closer toward the periphery of the disk than the zone to which tracks 100 and 101 belong. The data transmission speed when recording and playing back from the zone to which tracks 100 and 101 belong is lower than the data transmission speed when recording and playing back from the zone to which tracks (100+N−1) and (100+N) belong. Consequently, more logical addresses are allocated to the zones to which tracks (100+N−1) and (100+N) belong. Thus, tracks (100+N−1) and (100+N) have a greater number of sectors than tracks 100 and 101. FIGS. 5A and 5B show 40 sectors each on tracks 100 and 101 respectively and 80 tracks each on tracks (100+N−1) and (100+N) respectively.

In FIGS. 5A and 5B, the numbers depicted in the top portion of each track are the physical addresses, and the numbers depicted in the lower portions are the logical addresses. In each track, the physical addresses are attached to each sector in sequential order starting from zero.

CPU1 controls alternately allocating sequential logical addresses on surface A and surface B to allow as uniform a data transmission speed as possible, in the following manner. The initial logical addresses from 0 are sequentially attached to two continuous sectors from the sector of physical address 0 of track 100 of surface A (i.e., logical addresses 0 and 1 are attached to physical addresses 0 and 1 on surface A). The next sequential logical addresses are attached to four continuous sectors from the sector of physical address 0 of track (100+N) of surface B (i.e., logical addresses 2 to 5 are attached to physical addresses 0 to 3 of surface B). This allocation of sequential logical addresses to two continuous sectors in the zone of tracks 100 and 101, then the allocation of the next sequential logical addresses to four continuous sectors in the zone of tracks (100+N−1) and (100+N), is repeated until the respective zones are completely assigned with logical addresses. Thus, the logical addresses are allocated alternately to two continuous sectors of tracks 100 and 101 of surface A and to four continuous sectors of track (100+N−1) and track (100+N) of surface B.

When the allocation of logical addresses is complete for the zone to which tracks 100 and 101 belong on surface A and for the zone to which tracks (100+N−1) and (100+N) belong on surface B, logical addresses are then alternately allocated between the zone to which tracks (100+N−1) and (100+N) belong on surface A and the zone to which tracks 100 and 101 belong on surface B. Four continuous sectors each are allocated sequential logical addresses in the zone to which tracks (100+N−1) and (100+N) belong on surface A. The next two sequential logical addresses are then allocated to the zone to which tracks 100 and 101 belong on surface B. This alternate allocation of four sequential logical addresses to four continuous sectors in the zone to which tracks (100+N−1) and (100+N) belong on surface A, then the next two sequential logical addresses to two continuous sectors in the zone to which tracks 100 and 101 belong on surface B, is repeated until the respective zones are completely assigned with logical addresses.

With the optical disk according to this second embodiment, a more uniform data transmission speed is achieved during playback and recording of data. CPU1 controls access to the optical disk during playback and recording of data by determining the appropriate physical addresses based on the alternately allocated logical addressing scheme of this second embodiment. As indicated above, one characteristic of the second embodiment is that the distribution rate, by which the logical addresses are divided among surface A and B, is varied depending on the zone (track position). By arranging and accessing the logical sectors in this manner, the data transmission speed is made uniform in all regions on the optical disk.

The present invention is not limited to the optical disk playback and recording device of the second embodiment described above. For example, the logical address allocation may be performed in a different manner. Logical addresses before and after the logical address allocated to a region with a low transmission speed on surface A (inside zones) may be allocated to regions with a high transmission speed on surface B (peripheral zones). Then, the logical addresses before and after the logical address allocated to a region with a high transmission speed on surface A (peripheral zones) may be allocated to regions with a low transmission speed on surface B (inside zones).

In addition, it is more effective if the optical head, track following directions are in opposite directions on surfaces A and B, instead of being in the same direction. The reason is because the time of movement of the optical head at the zone boundary becomes smaller.

Moreover, the logical address allocation is not limited to the example depicted in FIGS. 5A and 5B in which the distribution of logical sectors was made to be 1:2 and 2:1 when there are two zones. Even if the optical disk has three zones or more, the logical addresses can be allocated such that the transmission speed becomes uniform by varying the distribution percentages on surface A and surface B between the zones in a similar manner.

Thus, according to the embodiments of the present invention, multiple optical heads can access the data of the desired logical sectors at the same time when accessing multiple sectors of continuous logical addresses, achieving increased on-line capacity and data transmission speeds. In addition, when the present invention is applied to a disk of a system in which the recording and playback frequency is higher for tracks located toward the periphery of the disk, not only is the data transmission speed increased, but also, the data transmission speed is made uniform across the entire disk surface.

It should be understood that although a few preferred embodiments of the present invention have been shown and described, it would be appreciated by those skilled in the art that changes may be made in these embodiments without departing from the principles and spirit of the invention, the scope of which is defined in the claims and their equivalents.

What is claimed is:

1. An optical disk playback and recording device, comprising:
   a control unit alternately allocating sequential logical addresses between single or multiple continuous sectors on each side of a two-sided optical disk having disk regions divided into tracks having sectors, having physical addresses set in order in respective sectors on both sides of the disk and having logical addresses alternately set on both sides of the disk with respect to the physical addresses; and
   first and second playback and recording heads, one disposed on each side of said disk, playing back data from or recording data to sectors identified by the logical addresses of data for playback or recording.

2. An optical disk playback and recording device according to claim 1, wherein said control unit alternately allocates sequential logical addresses between single or multiple continuous sectors on each side of said disk, starting from sectors in tracks located toward the center of said disk to sectors in tracks located toward the periphery of said disk.

3. An optical disk playback and recording device according to claim 1, wherein said control unit alternately allocates sequential logical addresses between single or multiple continuous sectors in tracks located toward the center of one side of said disk and single or continuous sectors in tracks located toward the periphery of the other side of said disk.

4. An optical disk playback and recording device according to claim 1, wherein said control unit alternately allocates sequential logical addresses between a varying number of continuous sectors on each side of said disk depending on the track location.

5. An optical disk playback and recording device according to claim 4, wherein said control unit alternately allocates sequential logical addresses between single or multiple continuous sectors in tracks located toward the center of one side of said disk and a greater number of sectors in tracks located toward the periphery of the other side of said disk.

6. An optical disk playback and recording device according to claim 1 comprising a plurality of said optical disks.

7. An optical disk playback and recording device, comprising:
   a control unit alternately allocating sequential logical addresses between single or multiple continuous sectors on each side of a two-sided optical disk having disk regions divided onto tracks having sectors, having physical addresses set in order in respective sectors on both sides of the disk and having logical addresses alternately set on both sides of the disk with respect to the physical addresses; and,
   first and second playback and recording heads, one disposed on each side of said disk, playing back data from or recording data to sectors identified by the logical addresses of data for playback or recording, said heads having a higher playback and recording frequency for tracks located toward the periphery of said disk.

8. An optical disk playback and recording device according to claim 7, wherein said control unit alternately allocates sequential logical addresses between single or multiple continuous sectors on each side of said disk, starting from sectors in tracks located toward the center of said disk to sectors in tracks located toward the periphery of said disk.

9. An optical disk playback and recording device according to claim 7, wherein said control unit alternately allocates sequential logical addresses between single or multiple continuous sectors in tracks located toward the center of one side of said disk and single or continuous sectors in tracks located toward the periphery of the other side of said disk.

10. An optical disk playback and recording device according to claim 7, wherein said control unit alternately allocates sequential logical addresses between a varying number of continuous sectors on each side of said disk depending on the track location.

11. An optical disk playback and recording device according to claim 10, wherein said control unit alternately allocates sequential logical addresses between single or multiple continuous sectors in tracks located toward the center of one side of said disk and a greater number of sectors in tracks located toward the periphery of the other side of said disk.

12. An optical disk playback and recording device according to claim 7 comprising a plurality of said optical disks.

13. An optical disk playback and recording device, comprising:

a control unit controlling access to a two-sided optical disk having disk regions divided into tracks having sectors, having physical addresses set in order in respective sectors on both sides of the disk, having logical addresses alternately set on both sides of the disk with respect to the physical addresses and having sequential logical addresses alternately allocated between single or multiple continuous sectors on each side of said disk; and, first and second playback and recording heads, one disposed on each side of said disk, playing back data from or recording data to sectors identified by the logical addresses of data for playback or recording.

14. An optical disk playback and recording device according to claim 13, wherein said control unit controls access to an optical disk having sequential addresses alternately allocated between single or multiple continuous sectors on each side of said disk, starting from sectors in tracks located toward the center of said disk to sectors in tracks located toward the periphery of said disk.

15. An optical disk playback and recording device according to claim 13, wherein said control unit controls access to an optical disk having sequential addresses alternately allocated between single or multiple continuous sectors in tracks located toward the center of one side of said disk and single or continuous sectors in tracks located toward the periphery of the other side of said disk.

16. An optical disk playback and recording device according to claim 13, wherein said control unit controls access to an optical disk having sequential addresses alternately allocated between a varying number of continuous sectors on each side of said disk depending on the track location.

17. An optical disk playback and recording device according to claim 16, wherein said control unit controls access to an optical disk having sequential addresses alternately allocated between single or multiple continuous sectors in tracks located toward the center of one side of said disk and a greater number of sectors in tracks located toward the periphery of the other side of said disk.

18. An optical disk playback and recording device according to claim 13, wherein said heads have a higher playback and recording frequency for tracks located toward the periphery of said disk.

19. An optical disk playback and recording device according to claim 13 comprising a plurality of said optical disks.

20. A method for increasing data transmission speeds in an optical disk playback and recording device, comprising the steps of:

alternately allocating sequential logical addresses between single or multiple continuous sectors on each side of a two-sided optical disk having disk regions divided into tracks and subdivided into sectors, having physical addresses set in order in respective sectors on both sides of the disk and having logical addresses alternately set on both sides of the disk with respect to the physical addresses;

accessing sectors, of said disk, identified by the logical addresses of data for playback or recording; and, playing back data from or recording data to said disk.

21. A method according to claim 20, wherein said alternately allocating step alternately allocates sequential logical addresses between single or multiple continuous sectors on each side of said disk, starting from sectors in tracks located toward the center of said disk to sectors in tracks located toward the periphery of said disk.

22. A method according to claim 20, wherein said alternately allocating step alternately allocates sequential logical addresses between single or multiple continuous sectors in tracks located toward the center of one side of said disk and single or continuous sectors in tracks located toward the periphery of the other side of said disk.

23. A method according to claim 20, wherein said alternately allocating step alternately allocates sequential logical addresses between a varying number of continuous sectors on each side of said disk depending on the track location.

24. A method according to claim 23, wherein said alternately allocating step alternately allocates sequential logical addresses between single or multiple continuous sectors in tracks located toward the center of one side of said disk and a greater number of sectors in tracks located toward the periphery of the other side of said disk.

25. A method for providing increased and uniform data transmission speeds in an optical disk playback and recording device having a higher playback and recording frequency toward the periphery of an optical task, comprising the steps of:

alternately allocating sequential logical addresses to single or multiple continuous sectors on each side of said disk having disk regions divided into tracks and subdivided into sectors, having physical addresses set in order in respective sectors on both sides of the disk and having logical addresses alternately set on both sides of the disk with respect to the physical addresses;

accessing sectors, of said disk, identified by the logical addresses of data for playback or recording; and, playing back data from or recording data to said disk.

26. A method according to claim 25 wherein said alternately allocating step alternately allocates sequential logical addresses between single or multiple continuous sectors on each side of said disk, starting from sectors in tracks located toward the center of said disk to sectors in tracks located toward the periphery of said disk.

27. A method according to claim 25, wherein said alternately allocating step alternately allocates sequential logical addresses between single or multiple continuous sectors in tracks located toward the center of one side of said disk and single or continuous sectors in tracks located toward the periphery of the other side of said disk.

28. A method according to claim 25, wherein said alternately allocating step alternately allocates sequential logical addresses between a varying number of continuous sectors on each side of said disk depending on the track location.

29. A method according to claim 28, wherein said alternately allocating step alternately allocates sequential logical addresses between single or multiple continuous sectors in tracks located toward the center of one side of said disk and a greater number of sectors in tracks located toward the periphery of the other side of said disk.

* * * * *